United States Patent [19]
Watanabe et al.

[11] Patent Number: 5,902,051
[45] Date of Patent: May 11, 1999

[54] CHARACTER PRINTING APPARATUS

[75] Inventors: Kenji Watanabe; Tomoyuki Shimmura; Takanobu Kameda; Chieko Aida, all of Tokyo; Hiroyasu Kurashina; Takeshi Hosokawa, both of Suwa, all of Japan

[73] Assignees: King Jim Co., Ltd.; Seiko Epson Corporation, both of Japan

[21] Appl. No.: 08/956,435

[22] Filed: Oct. 23, 1997

[30]       Foreign Application Priority Data

Nov. 15, 1996  [JP]  Japan .................................. 8-304446

[51] Int. Cl.$^6$ ........................................... B41J 5/30
[52] U.S. Cl. ............................ 400/61; 400/76; 400/615.2
[58] Field of Search ................................. 400/61, 70, 76, 400/586, 615.2, 708

[56]                  References Cited

U.S. PATENT DOCUMENTS

| 5,071,273 | 12/1991 | Kato ........................................ 400/708 |
| 5,494,360 | 2/1996 | Watanabe et al. .................... 400/615.2 |
| 5,498,087 | 3/1996 | Wey et al. .............................. 400/708 |
| 5,651,619 | 7/1997 | Nunokawa et al. ................. 400/615.2 |

FOREIGN PATENT DOCUMENTS 6143690  5/1994  Japan .

*Primary Examiner*—John Hilten
*Attorney, Agent, or Firm*—Lorusso & Loud

[57]                  ABSTRACT

The present invention relates to a character printing apparatus in which an input character string is printed on a plurality of print mediums loaded in the apparatus and having a transversal dimension, on which limitation is imposed, and different longitudinal dimensions. The character printing apparatus of the present invention is characterized in that the apparatus includes line-gap dot-number determining means for determining a line-gap dot number representing the number of dots to be allocated to a line gap and an external-line-gap dot number representing the number of dots to be allocated to an external line gap, the line gap being formed between consecutive two lines of the character string, the external line gap being formed between an upper edge of the print medium and a first line of the character string and between a lower edge of the print medium and a last line of the character string, and that the determination of the line-gap dot number and the external-line-gap dot number by the line-gap determining means is conducted through an arithmetic operation on the basis of the transversal dimension of the print mediums thus loaded, the number of lines of the input character string, and the character sizes of the respective lines of the character string.

2 Claims, 6 Drawing Sheets

FIG.5

| PLACE | CONSTITUENT ELEMENT | DOT NUMBER |
|---|---|---|
| EXTERNAL LINE GAP | OUTIDE-FRAME SPACE ALLOWANCE | W |
| | BASIC HALF LINE GAP | a |
| FIRST LINE | BASIC CHARACTER SIZE | $l_1$ |
| LINE GAP | BASIC HALF LINE GAP | a |
| | RULED-LINE SPACE ALLOWANCE | K |
| | BASIC HALF LINE GAP | a |
| SECOND LINE | BASIC CHARACTER SIZE | $l_2$ |
| LINE GAP | BASIC HALF LINE GAP | a |
| | RULED-LINE SPACE ALLOWANCE | K |
| | BASIC HALF LINE GAP | a |
| NTH LINE | BASIC CHARACTER SIZE | $l_N$ |
| EXTERNAL LINE GAP | BASIC HALF LINE GAP | W |
| | OUTSIDE-FRAME SPACE ALLOWNACE | |

FIG.6

| TAPE WIDTH | PRINT ALLOWABLE DOT NUMBER M |
|---|---|
| 6mm | 54 |
| 9mm | 81 |
| 12mm | 108 |
| 18mm | 162 |
| 24mm | 216 |
| 36mm | 256 |

FIG.7

| TAPE WIDTH | OUTSIDE-FRAME SPACE-ALLOWANCE DOT NUMBER W |
|---|---|
| 6mm | 2 |
| 9mm | 3 |
| 12mm | 4 |
| 18mm | 5 |
| 24mm | 7 |
| 36mm | 8 |

CHARACTER PRINTING APPARATUS

BACKGROUND OF THE INVENTION

1. Field of the Invention

The present invention relates to a character printing apparatus having a printing function or a transferring function. The present invention is preferably applicable, in particular, to a tape printing apparatus, a stamp producing apparatus or the like having a limitation (e.g., a limitation of several lines) on the number of lines of the character string to be printed or transferred.

2. Discussion of the Related Art

A tape printing apparatus, which is one of character printing apparatuses, is designed to facilitate preparation of a label originated by the user which is to be attached on a spine cover of a file or the like.

A conventional tape printing apparatus has a key which is provided on an operation panel and adapted to input characters so that a desired character string can be previously inputted by operating the key.

Also, the conventional tape printing apparatus has a tape feeding mechanism by which a tape can be fed and discharged through a tape discharging outlet.

Further, the conventional tape printing apparatus has a printing mechanism, including a thermal head, and a tape cutting mechanism provided in this order on the path for allowing the tape to be fed.

In the tape printing apparatus, when a print instruction key is operated, control means controls the tape feeding mechanism to feed the tape at a predetermined speed, and controls the tape printing mechanism to print the previously inputted character string on the tape thus fed.

Also, when printing of the character string is completed, the control means further controls the tape feeding mechanism to vacantly feed the tape (i.e., to feed the tape without performing printing on the tape) until a portion of the tape on which printing is completed is entirely positioned outside the tape printing apparatus, then causes the feeding of the tape to be stopped.

After the feeding of the tape is stopped, the tape portion associated with printing of the character string is cut off by the user with the tape cutting mechanism or by the action of an automatic tape cutting mechanism.

Thus, a label originated by the user having thereon a desired character string can be obtained.

In the tape printing apparatus which performs the above-mentioned processing, when printing is designated by operating the print instruction key, various types of print attributes are determined, and the printing of the character string is performed on the basis of the print attributes thus determined.

As one of the print attributes, a line-gap dot number can be mentioned. The line-gap dot number represents the number of dots allocated to the spacing (gap) formed between consecutive two lines of the character string. In the tape printing apparatus, the user find it more difficult to determine the line-gap dot number than in the other character printing apparatuses having a printing function, such as a word processor.

More specifically, in a word processor, it is common that the character sizes on the respective lines are the same, and that the dimensions of sheets serving as a print medium are also the same. Accordingly, the line-gap dot number can be obtained by a simple method of subtracting a specified character size from a specified line pitch. The term "line pitch" as used herein refers to the distance between the base lines of consecutive two lines of the character string.

In contrast, in the tape printing apparatus, since the print medium is a label (tape), it often happens that different character sizes are specified with respect to the respective lines of the character string. Also, the tape width varies with the tape serving as the print medium. Consequently, in the tape printing apparatus, it is difficult to determine the line-gap dot number by the above-mentioned simple method.

To solve the above-mentioned problems, in the conventional tape printing apparatus, as a way of deciding the line-gap dot number, a technique that there is provided a line-gap dot-number extracting table and the line-gap dot number is determined by accessing the table. The line-gap dot-number extracting table stores line-gap dot numbers each of which is related to the tape width of the loaded tape, the number of lines of the input character string and the character sizes of the respective lines of the input character string. The line-gap dot number is extracted by employing the tape width, the number of lines and the character sizes as keys (clues).

The line-gap dot-number extracting table also stores an external-line-gap dot number, and the external-line-gap dot number is also determined by using the line-gap dot-number extracting table in the same way as the line-gap dot number. The external-line-gap dot number represents the number of dots to be allocated to an external gap. The external line gap is formed between the upper edge of the tape and the first line of the character string. The external line gap is also formed between the lower edge of the tape and the last line of the character string.

However, the way of determining the line-gap dot number and the external-line-gap dot number by using the line-gap dot-number extracting table has a problem that the table fails to meet the requirement to reduce the total amount of the ROM to a small value since the number of conditions of determining the line-gap dot number and the external-line-gap dot number and accordingly data amount of the table are increased.

More specifically, with the widespread of tape printing apparatuses, the users have strongly demanded a tape printing apparatus which can treat various tape widths. To meet such a demand, tape printing apparatuses capable of treating various tape widths (e.g., six kinds of tape widths) have actually become commercially available. In such tape printing apparatuses, the maximum of the tape width is set to a value larger than the maximum tape width allowed by conventional tape printing apparatuses, and accordingly the number of the character sizes is inevitably increased. Also, when the tape width is set to the maximum or a near value, the number of lines of a character string allowed to be contained in the tape (label) is increased. Consequently, the number of combinations of the character sizes is also increased.

This implies that the number of conditions for determining the line-gap dot number and the external-line-gap dot number is increased, i.e., that the number of combinations of the parameters is increased. As a result, the amount of data constituting the line-gap dot-number extracting table becomes extremely large, and accordingly the data of the line-gap dot-number extracting table inevitably occupies a large part of the memory capacity of the ROM.

On the other hand, in order to meet requirement for compactness and low cost of the apparatus, a small-size character printing apparatus, such as a tape printing apparatus, must have a smaller ROM's memory capacity than a large-size character printing apparatus, such as a word processor.

Accordingly, if a large part of the ROM's memory capacity is allocated to the line-gap dot-number extracting table, the other parts of the ROM's memory capacity is taken up by the table, which unfavorably causes deterioration of functions related to the data stored in the taken-up area.

As a way of solving the above-described problem, a technique of increasing the amount of the ROM's memory capacity can be employed. However, when this technique is employed, it is necessary to provide a ROM having large memory capacity which is very expensive. Thus, increase in the amount of the ROM's memory itself causes the increase in the cost of the apparatus. Further, if more memory capacity is needed, a plurality of such expensive ROMs must be provided, and accordingly the requirement for compactness and low cost of the apparatus cannot be satisfied.

Under the above-mentioned circumstances, there has been a strong need for a character printing apparatus in which the amount of data for determining the line-gap dot number and the external-line-gap dot number to be previously provided in the apparatus is reduced to a small value.

The above-described problems also arise in a stamp producing apparatus used for producing a stamp.

SUMMARY OF THE INVENTION

The present invention is accomplished in view of the above-described problems. It is an object of the invention to provide a character printing apparatus in which the amount of data used for determining the line-gap dot number the external-line-gap dot number to be previously provided in the apparatus is reduced to a small value.

In order to achieve the above object, the present invention provides a character printing apparatus in which an input character string is printed on a plurality of print mediums loaded in the apparatus and having a transversal dimension, on which limitation is imposed, and different longitudinal dimensions, the apparatus including: (1) line-gap dot-number determining means for determining, through an arithmetic operation, a line-gap dot number representing the number of dots to be allocated to a line gap and an external-line-gap dot number representing the number of dots to be allocated to an external line gap, the line gap being formed between consecutive two lines of the character string, the external line gap being formed between an upper edge of the print medium and a first line of the character string and between a lower edge of the print medium and a last line of the character string, on the basis of the transversal dimension of the print mediums thus loaded, the number of lines of the input character string, and the character sizes of the respective lines of the character string; (2) print attribute determining means for determining print attributes other than the line-gap dot number and the external-line-gap dot number; (3) dot pattern developing means for developing a dot pattern corresponding to the input character string in accordance with a plurality of print attributes determined by the line-gap dot-number determining means and the print attribute determining means; and (4) printing means for printing the input character string on the print medium in accordance with the dot pattern thus developed.

It is preferred that the print medium is a tape.

The term "character" as used in the specification and claims of the present invention covers a symbol, an illustration, and the like. The term "character string" as used in the specification and claims of the present invention covers a character string containing characters, such as symbols and illustrations.

In the character printing apparatus of the present invention, the line-gap dot-number determining means determines a line-gap dot number representing the number of dots to be allocated to a line gap and an external-line-gap dot number representing the number of dots to be allocated to an external line gap, the print attribute determining means determines print attributes other than the line-gap dot number and the external-line-gap dot number, and the dot pattern developing means develops a dot pattern corresponding to the input character string in accordance with a plurality of print attributes determined by the line-gap dot-number determining means and the print attribute determining means. Also, the printing means prints the input character string on the print medium in accordance with the dot pattern thus developed. The determination of the line-gap dot number and the external-line-gap dot number by the line-gap dot-number determining means is conducted through an arithmetic operation on the basis of the transversal dimension of the print mediums thus loaded, the number of lines of the input character string, and the character sizes of the respective lines of the character string.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 5 is an explanatory view showing, in the form of a table, a transversal configuration of the tape in the embodiment of the present invention, in which the character string contains N lines;

FIG. 6 is an explanatory view showing the configuration of a print allowable dot number table in the embodiment of the present invention; and FIG. 7 is an explanatory view showing the configuration of an outside-frame space-allowance table of the embodiment of the present invention.

DETAILED DESCRIPTION OF THE INVENTION

Hereinafter, a tape printing apparatus as an embodiment of the character printing apparatus according to the present invention will be described with reference to the attached drawings.

(A) Overall Constitution of Electrical Members in the Embodiment

First, the overall constitution of electrical members in a tape printing apparatus as an embodiment of the character information processor according to the present invention will be described with reference to FIG. 2, which is a function block diagram showing the function of each element.

Figure 2:
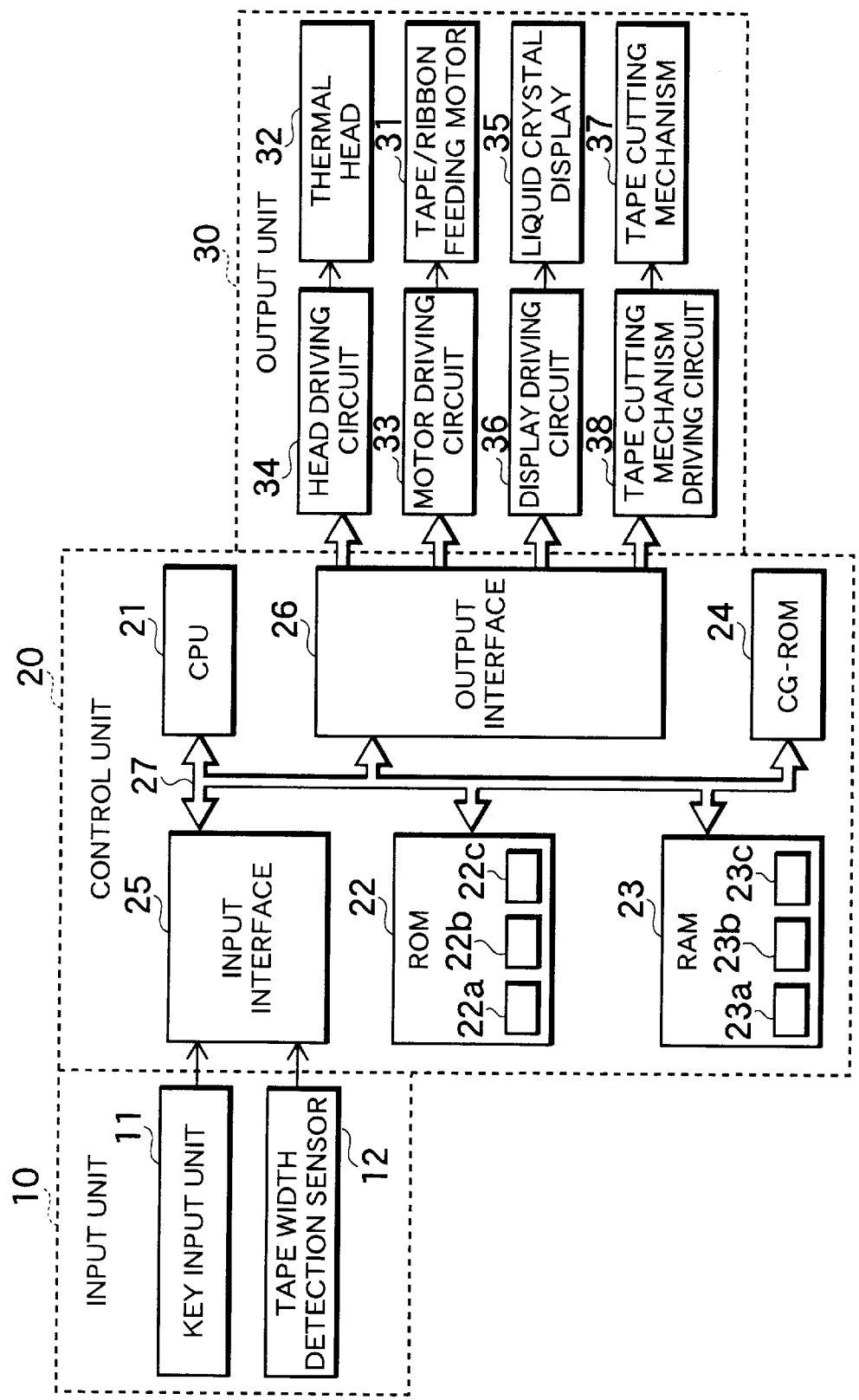
FIG. 2 is a function block diagram showing the overall constitution in the embodiment of the present invention.

As shown in FIG. 2, similarly to the other character printing apparatuses, the tape printing apparatus of this embodiment roughly includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, and a tape width detection sensor 12. The key input unit 11 is adapted to generate character code data and various types of control data to be supplied to the control unit 20. The tape width detection sensor 12 is adapted to detect the width of the loaded tape and to supply tape width information to the control unit 20. In actual, detecting the tape width by the sensor 12 is conducted by reading a physical identification element (e.g., a hole) provided on a tape cartridge (which accommodates the tape and an ink ribbon) and representing the width of the tape accommodated in the tape cartridge.

The output unit 30 includes members serving as a print mechanism and members serving as a display mechanism. The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the tape printing apparatus (both not shown) to a predetermined printing position or to the outside of the tape printing apparatus. The thermal head 32 is, for example, fixed and adapted to perform printing on the running tape by the thermal transferring method. The thermal head 32 have a performance of simultaneously printing, for example, 96 dots at its maximum. The tape/ribbon feeding motor 31 is driven by a motor driving circuit 33, and the thermal head 32 is driven by the head driving circuit 34, both driven under the control of the control unit 20.

The output unit 30 also includes a tape cutting mechanism 37 serving as the printing mechanism. The tape cutting mechanism 37 is adapted to cut the tape on which printing is performed and is driven by a tape cutting mechanism driving circuit 38 under the control of the control unit 20. It should be noted that, while the tape printing apparatus has the tape cutting mechanism 37 as shown in FIG. 2, a tape printing apparatus may be employed in which no tape cutting mechanism is provided and cutting of the tape is conducted by the force applied by the user.

In the case of the tape printing apparatus according to this embodiment, the output unit 30 includes a liquid crystal display 35 as the display mechanism. The liquid crystal display 35 is driven by a display driving circuit 36 under the control of the control unit 20 and adapted to directly display an input character string, various attribute information, and so on. On the display 35, there are displayed a plurality of indicators which are adapted to be lighted or lighted off to indicate states of the attributes (such as character sizes and input lines) designated by the characters printed at the portions lying on the apparatus body and surrounding the display 35.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and adapted to store fixed data associated with the user input. The RAM 23 is backed up even while the electric power is turned off.

The processing programs and the fixed data stored in the ROM 22, and the fixed data stored in the RAM 23 will be detailed later. The ROM 22 also stores a processing program 22a for determining a line-gap dot number and an external-line-gap dot number as later described, a print allowable dot number table 22b, and an outside-frame space-allowance table 22c. Also, in the RAM 23, a print buffer 23a, a character size holding section 23b, and a line-gap dot-number holding section 23c are appropriately formed.

The CG-ROM 24 is adapted to store font information of letters provided in the tape printing apparatus, and to output, when code data for specifying a letter are supplied, font information corresponding thereto. The font information stored in the CG-ROM 24 may be either of outline font and bitmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, by appropriately using fixed data stored in the ROM 22 or RAM 23. Also, the CPU 21 is adapted to cause the liquid crystal display 35 to display the state or result of the processing and so on, or to cause the state or result of the processing to be printed on a tape (not shown).

(B) Line-gap dot-number determination processing

Characteristic features of the embodiment of the present invention lie in processing of determining the line-gap dot number and the external-line-gap dot number (which will be often referred to as "line-gap dot-number determination processing" hereinafter).

It should be noted that the term "dot number" refers to the number of dots throughout the specification and claims of the present invention. This applies to the terms including the words "dot number" or "dot-number", such as "line-gap dot number" and "line-gap dot-number determination processing".

The line-gap dot-number determination processing is performed as a part of a sequence of print processing (or layout display processing). Therefore, the flow of the entire sequence of print processing will be described hereinafter with reference to FIG. 3, which is the flowchart showing the entire sequence of print processing of the embodiment.

Figure 3:
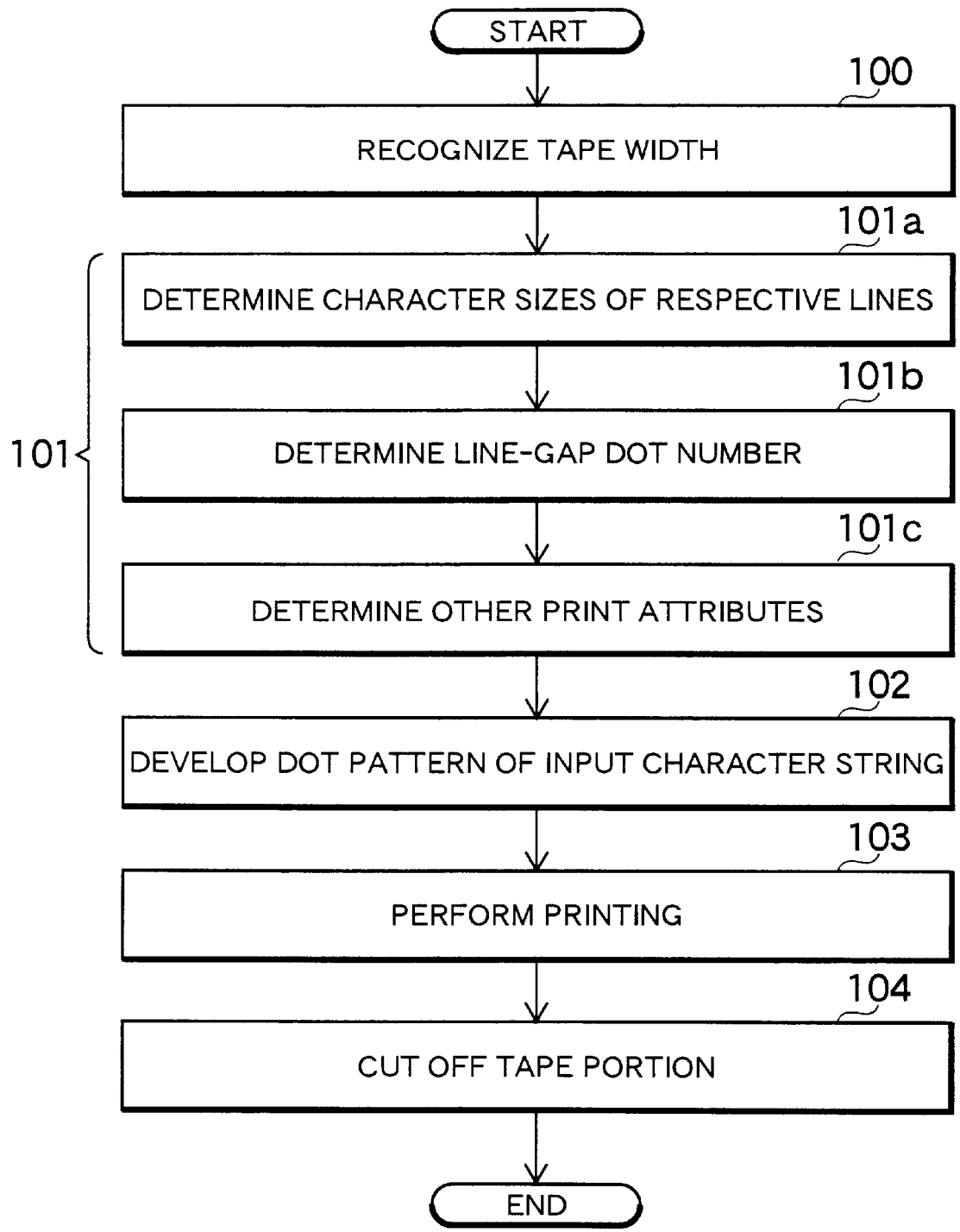
FIG. 3 is a flowchart showing a sequence of print processing of the embodiment.

The CPU 21 starts the sequence of print processing shown in FIG. 3 when the CPU 21 recognizes that the print instruction key of the key input unit 11 is operated.

The CPU 21 first recognizes the tape width of the tape loaded in the apparatus on the basis of the detection signal detected by the tape width detection sensor 12 (step 100). If no tape is loaded in the tape printing apparatus, a message for urging the user to load a tape into the apparatus is displayed under the control of the CPU 21.

Thereafter, the CPU 21 performs processing of determining various print attributes (step 101). The processing of determining the various print attributes includes: processing of determining the character sizes of the respective lines (which will be often referred to as "character-size determination processing" hereinafter) (step 101a); line-gap dot-number determination processing (step 101b); and processing of determining print attributes other than the line-gap dot number and the external-line-gap dot number (which will be often referred to as "other-print-attribute determination processing" hereinafter) (step 101c).

The character-size determination processing executed at step 101a is processing of changing a character size specified by relative specification method into a character size of an absolute value. The relative specification method is a technique of specifying character sizes of the respective lines of the character string as a relative relationship between the character sizes of the respective lines. Specifically, according to the relative specification method, assuming that the character string contains two lines, the character sizes of the characters in the first and second lines can be specified as a relative relationship between character sizes, such as "large vs. small", "medium vs. medium" and "small vs. large". With the relative specification method, the user does not need to change the character size each time the tape width of the loaded tape is changed. The character sizes (basic character sizes) determined in the character-size determination processing is stored in the character size holding section 23b.

After completing the character-size determination processing at step 101a, the CPU 21 performs at step 101b the line-gap dot-number determination processing, which will be detailed later. The line-gap dot number and the external-line-gap dot number determined in the line-gap dot-number determination processing is stored in the line-gap dot-number holding section 23c. It should be noted that the character-size determination processing must be performed before the line-gap dot-number determination processing.

After completing the line-gap dot-number determination processing, the CPU 21 performs at step 101c the other-print-attribute determination processing. In the other-print-attribute determination processing, the print attributes other than the character size, the line-gap dot number and the external-line-gap dot number, i.e., a label length and margins formed on the front and rear portions of the label are determined. It should be noted that the other-print-attribute determination processing may be performed before the line-gap dot-number determination processing.

Here, if the input character string has a plurality of portions which have a different number of lines, or which have different character sizes while having the same number of lines, each of the portions is referred to as "paragraph". It should be noted that the term "paragraph" as used herein refers to a smaller unit than a character string. The determinations of the character size and the line-gap dot number are performed with respect to each paragraph.

After completing the processing of determining the various print attributes at step 101, the CPU 21 causes the dot pattern of the input character string to be developed in the print buffer 23a (step 102). Specifically, the CPU 21 accesses the CG-ROM 24 and extracts a dot pattern of the input character string on the basis of code data of the input character and the character size thus determined, and stores the extracted dot pattern into the print buffer 23a.

After completing development of the dot pattern of the input character string, the CPU 21 appropriately activates the elements of the thermal head 32 in accordance with the dot pattern thus developed, and controls the tape/ribbon feeding motor 31 to perform printing (step 103). Thereafter, the CPU 21 controls the tape cutting mechanism 37 to cut off the tape portion on which printing is completed, and terminates the sequence of print processing (step 104). It should be noted that the printing executed at step 103 and the cutting-off of the tape portion executed at step 104 may be performed in parallel with the development of the dot pattern of the character string executed at step 102.

In the case of a tape printing apparatus in which the line gap and the external line gap are included in the object of the development of the dot pattern executed in the print buffer 23a, the line-gap dot number and the external-line-gap dot number stored in the line-gap dot-number holding section 23c are used when the dot pattern is developed. In contrast, in the case of a tape printing apparatus in which the line gap and the external line gap are not included in the object of the development of the dot pattern, the line-gap dot number and the external-line-gap dot number stored in the line-gap dot-number holding section 23c are used when the dot pattern is transferred to the thermal head 32.

Next, the line-gap dot-number determination processing will be described. Before the processing is detailed, a configuration of each paragraph, i.e., a configuration of dots arranged in the transversal direction of the tape with respect to each paragraph will be described with reference to FIGS. 4A, 4B and 5.

Figure 4A:
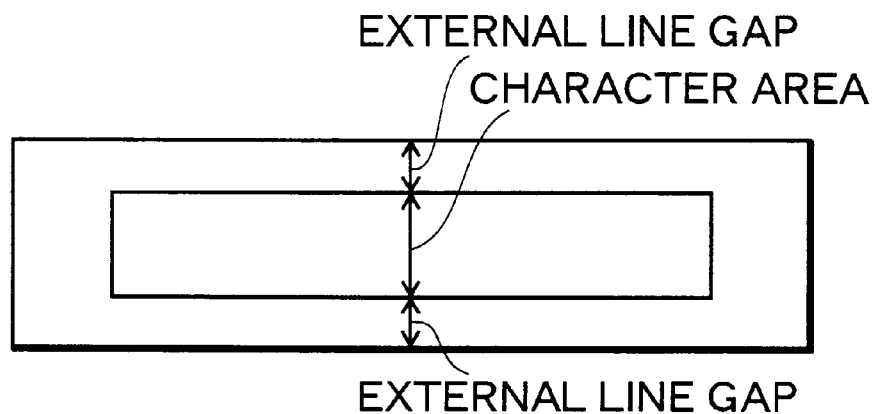
FIG. 4A is an explanatory view showing a transversal configuration of the tape in the embodiment of the present invention, in which the character string has one line.

FIG. 4A shows a configuration of a paragraph containing one line. When observed along the transversal direction of the tape, the paragraph containing one line is constituted by a character area, an external line gap formed between the upper edge of the tape and the character area, and an external line gap formed between the lower edge of the tape and the character area.

Figure 4B:
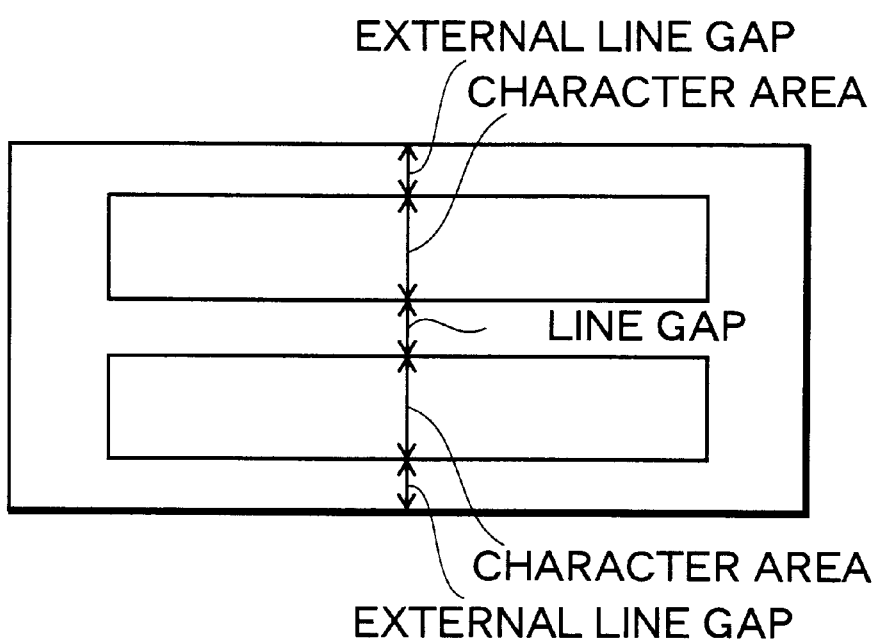
FIG. 4B is an explanatory view showing a transversal configuration of the tape in the embodiment of the present invention, in which the character string has two lines.

FIG. 4B shows a configuration of a paragraph containing two lines. When observed along the transversal direction of the tape, the paragraph containing one line is constituted by the character areas of the respective lines of the character string, an external line gap formed between the upper edge of the tape and the character area of the first line, an external line gap formed between the lower edge of the tape and the character area of the second line, and a line gap between the character area of the first line and that of the second line.

FIG. 5 shows a configuration of a paragraph containing N lines. When observed along the transversal direction of the tape, the paragraph containing N lines is constituted, as shown in the first column of the table in FIG. 5, by character areas of the respective lines, an external line gap formed between the upper edge of the tape and the character area of the first line, an external line gap formed between the lower edge of the tape and the character area of the last line, and line gaps formed between the character areas of an ith line (i represents 1 to (N−1)) and an (i+1)th line.

It should be noted that in each of the above-described configurations of the paragraph, the former external line gap corresponds to an upper margin of the tape while the latter external line gap corresponds to a lower margin of the tape. Hereinafter, the former external line gap will be often referred to as "upper external line gap" while the latter external line gap will be often referred to as "lower external line gap".

In this embodiment, each of the upper and lower external line gaps is constituted by a basic half line gap positioned near the character area and having a dot number of a, and an outside-frame space allowance having a dot number of W. On the other hand, each of the line gaps is constituted by two basic half line gaps each positioned near a character area and having a dot number a, and a ruled-line space allowance positioned between the two basic half line gaps and having a dot number of K.

The ruled-line space allowance determines the central position of a ruled line to be drawn. Specifically, when the number of dots to be allocated to the ruled line is smaller than the dot number K of the ruled-line space allowance, the ruled line is drawn within the ruled-line space allowance. By contrast, when the number of dots to be allocated to the ruled line is larger than the dot number K of the ruled-line space allowance, a part of each of the basic half line gaps positioned immediately above and below the ruled-line space allowance is also allocated to the ruled line.

Each of the outside-frame space allowances contains the ruled-line space allowance. Specifically, in the case where a ruled line is drawn in the external area of the first line (i.e., the area between the first line and the upper edge of the tape) or in the external area of the Nth line (i.e., the area between the Nth line and the lower edge of the tape), the ruled-line space allowance lies within the outside-frame space allowance. In other words, the dot number W of the outside-frame space allowance is larger than the dot number K of the ruled-line space allowance.

Also, the outside-frame space allowances serve to reliably offer the upper and lower margins. Specifically, even when a basic-half-line-gap dot number a obtained through an arithmetic operation as later described becomes a negative number, the upper and lower margins can be reliably provided since the outside-frame space allowances are provided.

Figure 1:
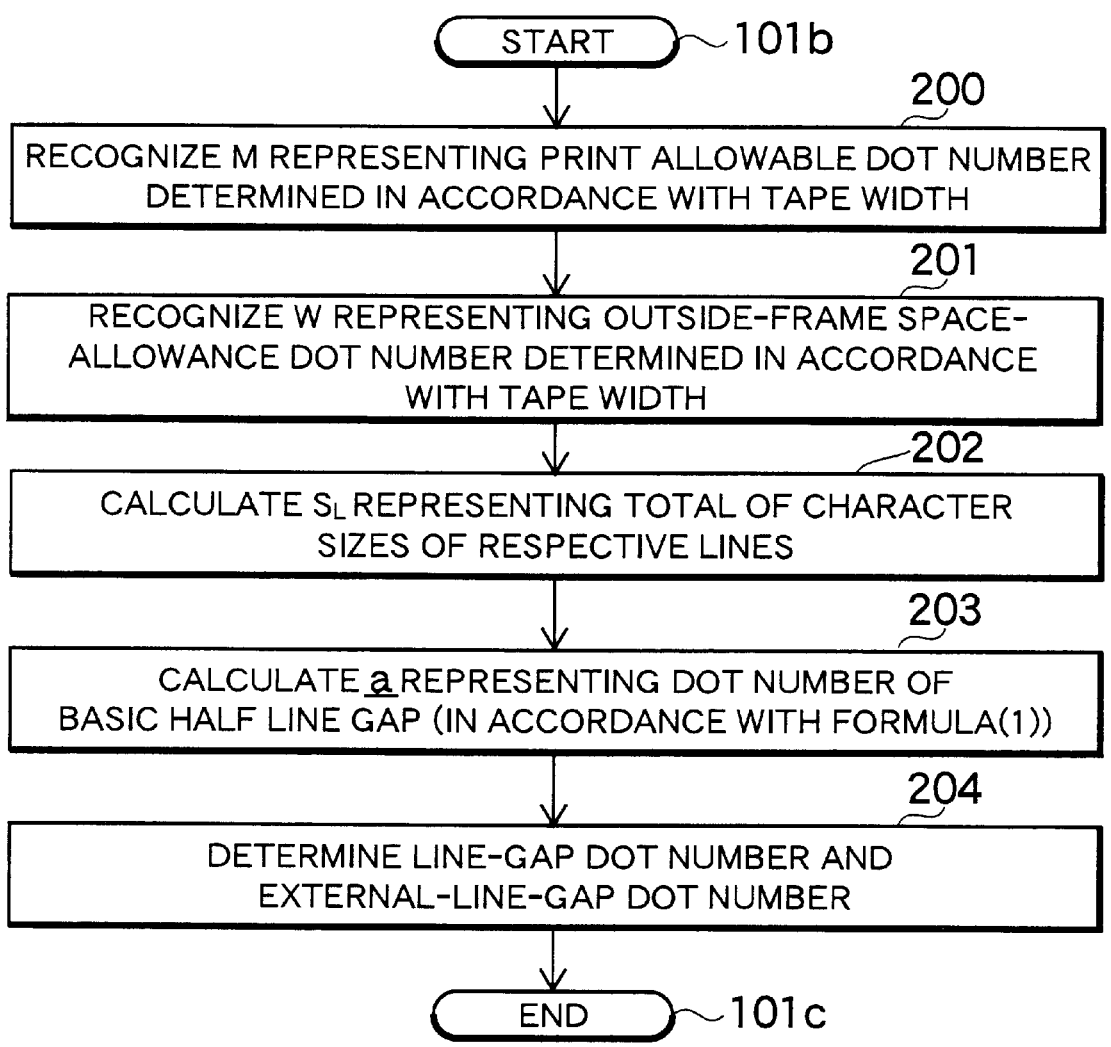
FIG. 1 is a flowchart showing processing of determining a line-gap dot number and an external-line-gap dot number in the embodiment of the present invention.

Hereinafter, a line-gap dot-number determination processing executed at step 101b will be detailed with reference to the flowchart shown in FIG. 1.

On entering the line-gap dot-number determination processing shown in FIG. 1, the CPU 21 recognizes M representing the number of dots which can be printed on the tape (which will be often referred to as "print allowable dot number" hereinafter), M being determined in accordance with the tape width of the loaded tape by accessing a print allowable dot number table 22b shown in FIG. 6 (step 200). The CPU 21 also recognizes W representing the dot number of the outside-frame space allowance (which will be often referred to as "outside-frame space-allowance dot number" hereinafter), W being determined in accordance with the tape width of the loaded tape by accessing an outside-frame space-allowance table 22c (step 201). Further, the CPU 21 calculates $S_L(=l_1+ \ldots +l_N)$ representing a total of the character sizes of the respective lines, which are stored in the character size holding section 23b (step 202). The character sizes are measured along the transversal direction of the tape.

Thereafter, an arithmetic operation in accordance with formula (1) described below is performed and the resultant quotient (the quotient being given as an integer) obtained through the arithmetic operation is determined as the dot number of the basic half line gap and expressed as a (step 203).

$$a=(M-S_L-2W-(N-1)K)/2N \qquad (1)$$

wherein K represents the dot number of the ruled-line space allowance which is determined to a fixed value independent of the tape width (e.g., K=2); N represents the number of lines of the character string; and M, W and $S_L$ are as stated above.

As shown in formula (1), a representing the dot number of the basic half line gap is determined in the following procedure. First, the total number of dots which can be allocated to the line gaps and the external line gaps is calculated by subtracting $S_L$ representing the total number of dots to be allocated to the character areas from M representing the print allowable dot number, to thereby obtain $(M-S_L)$. Then, 2W representing the dot number of the upper and lower outside-frame space allowances and (N-1)K representing the dot number of the ruled-line space allowances are subtracted from $(M-S_L)$, to thereby obtain $(M-S_L-2W-(N-1)K)$. Finally, $(M-S_L-2W-(N-1)K)$ is divided by 2N representing the number of the basic half line gaps, to thereby obtain a representing the dot number of one basic half line gap (which will be often referred to as "basic-half-line-gap dot number" hereinafter).

If a residual b is produced as a result of the division in accordance with formula (1), the basic-half-line-gap dot number becomes (a+1), which is obtained by adding 1 to a, with respect to the basic half line gaps of b counted from the first line, while the basic-half-line-gap dot number remains to be a with respect to the remaining basic half line gaps.

Finally, the CPU 21 determines the dot numbers of each line gap and each external line gap in accordance with the allocation shown in the third column of the table in FIG. 5, and causes the dot number holding section 23c to store the dot numbers thus determined, and then terminates the line-gap dot-number determination processing (step 204).

(C) Advantages of the Embodiment

As described above, according to the tape printing apparatus of the above-described embodiment, since the dot numbers of each of the line gaps and each of the external line gaps are obtained through the arithmetic operation, the amount of data for determining the line-gap dot number and the external-line-gap dot number to be previously provided in the apparatus can be reduced.

Accordingly, since even when the number of the kinds of the tape width of the loaded tape and the number of kinds of the character size are increased, it is not necessary to increase the capacity of the ROM 22, so that the tape printing apparatus can be made compact and inexpensive. Further, when the number of kinds of the tape width of the loaded tape are at substantially same level as those in conventional tape printing apparatuses, the amount of data for determining the line-gap dot number and the external-line-gap dot number to be previously provided in the apparatus is markedly reduced compared with in the conventional apparatuses. Accordingly, the room made by such data amount reduction can be allocated to data for the other functions, so that the other functions can be enriched and enhanced.

(D) Other embodiments

Although the preferred embodiments of the present invention have been described above, it should be understood that the present invention is not limited thereto and that other embodiments will be apparent to those skilled in the art without departing from the spirit of the invention.

For example, in the above-mentioned embodiment, the dot number of the ruled-line space allowance is determined to a fixed value independent of the tape width. However, the dot number of the ruled-line space allowance may be made to a value variable according to the tape width. Further, the dot number of the outside-frame space allowance may be made to a fixed value instead of the dot number of the ruled-line space allowance.

Further, in the above-mentioned embodiment, the tape has the transversal configuration shown in FIG. 5, which is realized by determining, through an arithmetic operation, the dot numbers of the line gaps and external line gaps.

However, in the present invention, the transversal configuration of the tape is not limited thereto.

For example, the tape may have a transversal configuration in which the ruled-line space allowance as shown in FIG. 5 is not provided but the line gap is constituted by two basic half line gaps. In this case, an arithmetic operation in accordance with formula (2) described below is conducted to obtain the dot number a of the basic half line gap so that the dot numbers of the line gaps and the external line gaps can be calculated.

$$a = (M - S_L - 2W)/2N \quad (2)$$

wherein M, W, $S_L$ and N are as stated in formula (1).

Alternatively, the tape may have a transversal configuration in which the outside-frame space allowance as shown in FIG. 5 is not provided but the external line gap is determined to a dimension 1.5 times that of the basic half line gap. In this case, an arithmetic operation in accordance with formula (3) described below is conducted to obtain the dot number a of the basic half line gap so that the dot numbers of the line gaps and the external line gaps can be calculated.

$$a = (M - S_L - NK)/2N \quad (3)$$

wherein M, $S_L$ and NK are as stated in formula (1).

Further, in the above-described embodiment, the processing of determining the various print attributes, which includes the character-size determination processing, the line-gap dot-number determination processing and the other-print-attribute determination processing, is performed as a part of the sequence of print processing (including layout display serving as a quasi print processing). However, the processing of determining the various print attributes may be performed at an occasion before the character line is inputted or at an occasion when the number of lines of the input character string is changed while the character string is being inputted.

Further, in the above-described embodiment, determinations of the dot numbers of the line gaps and the external line gaps are performed by the CPU which executes the program for determining a line-gap dot number stored and an external-line-gap dot number in the ROM. However, the determination processing may be performed by a specific circuit for determining print attributes, such as a DSP (digital signal processor). Alternatively, the arithmetic operation for determination of dot numbers of the line gaps the external line gaps may be performed by hardware, such as logical circuits.

(E) Advantages of the Invention

As described above, according to the character printing apparatus according to the present invention, since the line-gap dot-number determining means determines dot numbers of the external line gap and the line gap through an arithmetic operation on the basis of the transversal dimension of the loaded print medium, the number of lines of the input character string and the character sizes of the respective lines of the character string, the amount of data used for determining the line-gap dot number and the external-line-gap dot number which is previously provided in the apparatus can be reduced to a small value.

It should be noted that, since the present invention is not limited to the above-described embodiments and modifications, and that the scope of the invention is to be determined solely by the appended claims.

What is claimed is:

1. A character printing apparatus in which an input character string is printed on a plurality of print mediums loaded in said apparatus and having a transversal dimension, on which limitation is imposed, and different longitudinal dimensions, said apparatus comprising:

line-gap dot-number determining means for determining, through an arithmetic operation, a line-gap dot number representing the number of dots to be allocated to a line gap and an external-line-gap dot number representing the number of dots to be allocated to an external line gap, the line gap being formed between consecutive two lines of the character string, the external line gap being formed between an upper edge of the print medium and a first line of the character string and between a lower edge of the print medium and a last line of the character string, on the basis of the transversal dimension of the print mediums thus loaded, the number of lines of the input character string, and the character sizes of the respective lines of the character string;

print attribute determining means for determining print attributes other than the line-gap dot number and the external-line-gap dot number;

dot pattern developing means for developing a dot pattern corresponding to the input character string in accordance with a plurality of print attributes determined by said line dot number determining means and said print attribute determining means; and printing means for printing the input character string on the print medium in accordance with the dot pattern thus developed.

2. A character printing apparatus according to claim 1, wherein said print medium is a tape.

* * * * *